US008195660B2

(12) United States Patent  
Rosario et al.

(10) Patent No.: US 8,195,660 B2
(45) Date of Patent: Jun. 5, 2012

(54) METHOD AND APPARATUS TO REORDER SEARCH RESULTS IN VIEW OF IDENTIFIED INFORMATION OF INTEREST

(75) Inventors: Barbara Rosario, Berkeley, CA (US); William Noah Schilit, Menlo Park, CA (US)

(73) Assignee: Intel Corporation, Santa Clara, CA (US)

(*) Notice: Subject to any disclaimer, the term of this patent is extended or adjusted under 35 U.S.C. 154(b) by 675 days.

(21) Appl. No.: 11/771,883

(22) Filed: Jun. 29, 2007

(65) Prior Publication Data

US 2009/0006372 A1    Jan. 1, 2009

(51) Int. Cl.
    *G06F 7/00*       (2006.01)
    *G06F 17/30*      (2006.01)

(52) U.S. Cl. .............. 707/736; 707/750; 707/758
(58) Field of Classification Search .................. None
    See application file for complete search history.

(56) References Cited

U.S. PATENT DOCUMENTS

| | | | | |
|---|---|---|---|---|
| 5,655,148 | A * | 8/1997 | Richman et al. | 710/8 |
| 5,935,262 | A * | 8/1999 | Barrett et al. | 714/46 |
| 6,411,950 | B1 * | 6/2002 | Moricz et al. | 707/3 |
| 6,640,278 | B1 * | 10/2003 | Nolan et al. | 711/6 |
| 7,062,451 | B1 * | 6/2006 | Dentel et al. | 705/26.7 |
| 7,555,556 | B2 * | 6/2009 | Motoyama | 709/227 |
| 7,953,851 | B2 * | 5/2011 | Britton et al. | 709/224 |
| 2002/0023959 | A1 * | 2/2002 | Miller et al. | 235/462.13 |
| 2002/0078161 | A1 * | 6/2002 | Cheng | 709/208 |
| 2002/0078293 | A1 * | 6/2002 | Kou et al. | 710/305 |
| 2002/0111698 | A1 * | 8/2002 | Graziano et al. | 700/17 |
| 2002/0169765 | A1 * | 11/2002 | Saltz | 707/3 |
| 2003/0041088 | A1 * | 2/2003 | Wilson et al. | 709/104 |
| 2003/0061267 | A1 * | 3/2003 | Dunstan | 709/201 |
| 2003/0088544 | A1 * | 5/2003 | Kan et al. | 707/3 |
| 2005/0060527 | A1 * | 3/2005 | Philyaw | 713/1 |
| 2005/0136949 | A1 * | 6/2005 | Barnes, Jr. | 455/461 |
| 2005/0160190 | A1 * | 7/2005 | Bhesania et al. | 710/1 |
| 2005/0210119 | A1 * | 9/2005 | Kumar | 709/217 |
| 2006/0069663 | A1 * | 3/2006 | Adar et al. | 707/1 |
| 2006/0094360 | A1 * | 5/2006 | Jung et al. | 455/41.2 |
| 2006/0156307 | A1 * | 7/2006 | Kunjithapatham et al. | 718/103 |
| 2006/0184693 | A1 * | 8/2006 | Rao et al. | 709/245 |
| 2006/0195440 | A1 * | 8/2006 | Burges et al. | 707/5 |
| 2006/0230130 | A1 * | 10/2006 | Cho et al. | 709/223 |
| 2006/0242129 | A1 * | 10/2006 | Libes et al. | 707/3 |
| 2006/0271364 | A1 * | 11/2006 | Mirkovic et al. | 704/239 |
| 2007/0075916 | A1 * | 4/2007 | Bump et al. | 345/3.1 |
| 2007/0112909 | A1 * | 5/2007 | Miyamoto et al. | 709/200 |

(Continued)

OTHER PUBLICATIONS

*Proceedings of the NIPS 2005 Workshop on Learning to Rank*, Agarwal, S., et al., Editors,(Dec. 9, 2005), 44 pgs.

(Continued)

*Primary Examiner* — Wilson Lee
*Assistant Examiner* — Jessica N Le
(74) *Attorney, Agent, or Firm* — Schwegman, Lundberg & Woessner, P.A.

(57) ABSTRACT

Various embodiments described herein provide systems, methods, and software to automatically reorder search results presented to users based on information specific to the user or the computing environment of the user. Some embodiments include a data store holding user or environment specific data that is used to identify search results that are more likely to be relevant to the user. These and other embodiments are described in greater detail herein.

9 Claims, 4 Drawing Sheets

U.S. PATENT DOCUMENTS

| | | | |
|---|---|---|---|
| 2007/0214131 A1* | 9/2007 | Cucerzan et al. | 707/5 |
| 2007/0244584 A1* | 10/2007 | John et al. | 700/86 |
| 2008/0016101 A1* | 1/2008 | Ginsburg et al. | 707/102 |
| 2008/0201132 A1* | 8/2008 | Brown et al. | 704/9 |
| 2008/0243838 A1* | 10/2008 | Scott et al. | 707/5 |
| 2008/0250010 A1* | 10/2008 | Rathod et al. | 707/5 |
| 2008/0294617 A1* | 11/2008 | Chakrabarti et al. | 707/5 |
| 2008/0313179 A1* | 12/2008 | Trepess et al. | 707/5 |
| 2009/0019091 A1* | 1/2009 | Horvitz et al. | 707/201 |

OTHER PUBLICATIONS

"E-Mail as Costly as Telephone Support", [online]. [archived Apr. 22, 2007]. Retrieved from the Internet: <URL: http://web.archive.org/web/20070422173840/http://www.quantos-stat.com/crm-news/news17.htm>, 2 pgs.

"Reaching Out for Help", *CIO Magazine*, [online}. [archived Mar. 7, 2007]. Retrieved from the Internet: <URL: http://web.archive.org/web/20070307030241/http://www.cio.com/archive/100199_et.html>,(Oct. 1, 1999), 11 pgs.

"Why the PC Industry Must Improve New Technology's Quality and Ease of Use", *Intel® White Paper*, (Mar. 19, 2004), 8 pgs.

Aslam, J. A., et al., "Models for Metasearch", *Proceedings of the 24th International ACM SIGIR Conference on Research and Development in Information Retrieval (SIGIR '01)*, (2001), 276-284.

Bartell, B. T., et al., "Automatic Combination of Multiple Ranked Retrieval Systems", *Proceedings of the 17 Annual International ACM SIGIR Conference on Research and Development in Information Retrieval*, (1994), 173-181.

Bly, S., et al., "Broken Expectations in the Digital Home", *Proceedings of Conference on Human Factors in Computing System (CHI '06)*, (Apr. 22-27, 2006, Montreal, Quebec, Canada),(2006), 568-573.

Charny, B., "The World Wide Web!", *ZDNet News*, [online]. [archived Oct. 7, 2001]. Retrieved from the Internet: <URL: http://web.archive.org/web/20011007012208/http://www.zdnet.com/zdnn/stories/news/0,4586,2667216,00.html>,(Dec. 23, 2000), 4 pgs.

Cohen, W. W., et al., "Learing to Order Things", *Proceedings of the 1997 Conference—Advances in Neural Information Processing System*, 10, (1998), 451-457.

Freund, Y., et al., "An Efficient Boosting Algorithm for Combining Preferences", *Proceedings of the Fifteenth International Conference on Machine Learning (ICML '98)*, (1998), 170-178.

Goldberg, D., et al., "Using Collaborative Filtering to Weave an Information Tapestry", *Communications of the ACM*, 35(12), (1992), 61-70.

Grinter, W. K., et al., "The Work to Make a Home Network Work", *Proceedings of the Ninth European Conference on Computer-Supported Cooperative Work (ECSCW)*, (Sep. 18-22, 2005, Paris, France), (2005), 469-488.

Han, B., et al., "Reranking Medline Citations by Relevance to a Difficult Biological Query", *Proceedings laSTED International Conference on Neural Networks and Computational Intelligence*, (Cancun, Mexico),(2003), 6 pgs.

Haveliwala, T. H., "Topic-Sensitive PageRank: A Context-Sensitive Ranking Algorithm for Web Search", *IEEE Transactions on Knowledge and Data Engineering*, 15(4), (2003), 784-796.

Huang, X., "Incorporating Contextual Retrieval into Okapi", *Proceedings of the ACM SIGIR Workshop on Information Retrieval in Context (IRiX)*, (2005), 21-23.

Kim, H.-R., "Personalized Ranking of Search Results with Learned User Interest Hierarchies from Bookmarks", *Proceedings of the Workshop on Knowledge Discovery in the Web (KDD 2005)*, (2005), 10 pgs.

Konstan, J. A., et al., "GroupLens: Applying Collaborative Filtering to Usenet News", *Communications of the ACM*, 40(3), (1997), 77-87.

Lebanon, G., et al., "Cranking: Combining Rankings Using Conditional Probability Models on Permutations", *Proceedings of the 19th International Conference on Machine Learning (ICML 2002)*, (2002), 363-370.

Lin, W.-H., et al., "Web Image Retrieval Re-Ranking with Relevance Model", *Proceedings of the IEEE/WIC International Conference on Web Intelligence (WI '03)*, (Oct. 13-17, 2003, Halifax, Canada),(2003), 242-248.

Pazzani, M., et al., "Syskill & Webert: Indentifying Interesting Web Sites", *Proceedings of the Thirteenth National Conference on Artificial Intelligence (AAAI96)* (vol. One), (1996), 54-61.

Schilit, B., et al., "Context-Aware Computing Applications", *Proceedings, Workshop on Mobile Computing Systems and Applications*, (1995), 85-90.

Schilit, W. N., et al., "Providing More Relevant Answer to a Query via Query and/or Answer Processing", U.S. Appl. No. 11/614,519, filed Dec. 21, 2006, (Intel P24966).

Vogt, C., et al., "Using Relevance to Train a Linear Mixture of Experts", *Proceedings, The Fifth Text REtrieval Conference (TREC-5)*, (1997), 13 pgs.

\* cited by examiner

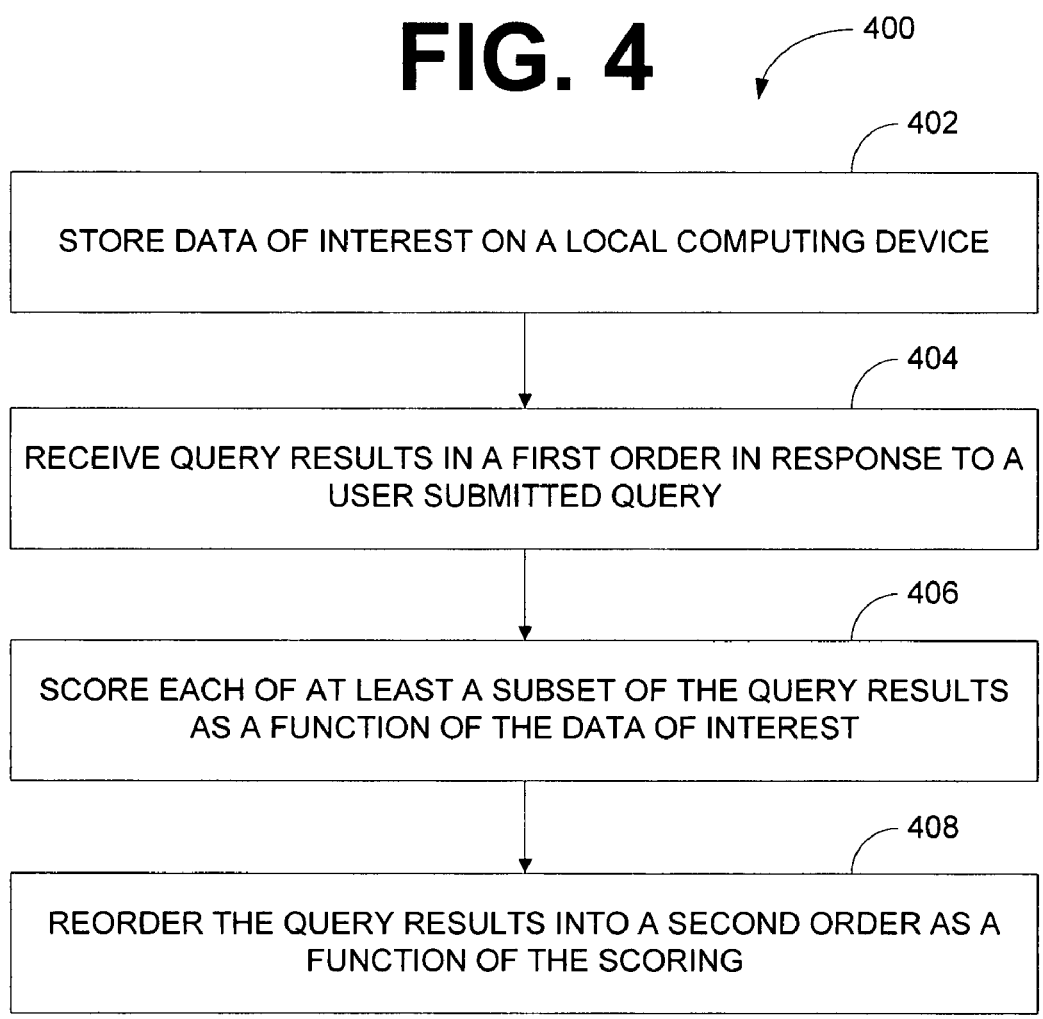

METHOD AND APPARATUS TO REORDER SEARCH RESULTS IN VIEW OF IDENTIFIED INFORMATION OF INTEREST

BACKGROUND INFORMATION

Searching for data using online searching tools often yields irrelevant results. Such search results are often irrelevant because searching utilities provide results based on what the public as a whole may be looking for rather than the specific user. Further, a user may not know how to search for the desired information. For example, a user searching for information on setting up a wireless router may not know or have much information about the router being set up. Thus, when such a user submits a query such as "wireless router setup," the user may receive search results about brand X routers when the user has a brand Y router.

BRIEF DESCRIPTION OF THE DRAWINGS

FIG. 4 is a block flow diagram of a method according to an example embodiment.

DETAILED DESCRIPTION

Various embodiments described herein provide systems, methods, and software to automatically reorder search results presented to users based on information specific to the user or the computing environment of the user. Some embodiments include a data store holding user or environment specific data that is used to identify search results that are more likely to be relevant to the user. These and other embodiments are described in greater detail herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
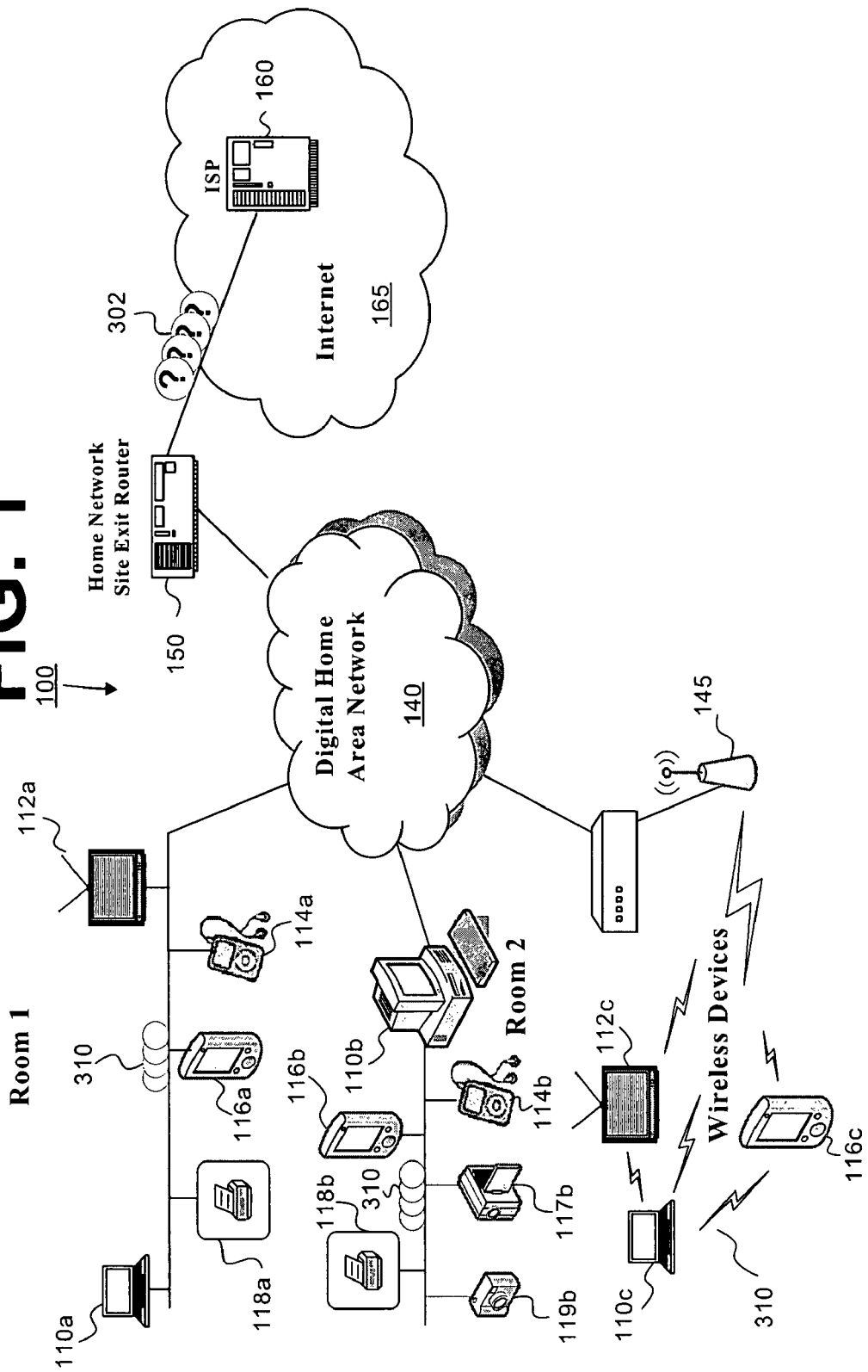
FIG. 1 illustrates a block diagram of in exemplary networked environment including a host platform according to an example embodiment.

FIG. 1 illustrates a block diagram of an exemplary networked environment including a host platform according to an example embodiment. Specifically, a host platform 110a, 110b, or 110c is illustrated as being coupled to a variety of different remote home network devices (e.g. 112-165). The host platform 110a, 110b, or 110c receives device specific information 310 from each of the network devices 112-165 connected to the network. In various embodiments, the device specific information may be shared by each of the host platforms and/or network devices within the network. The digital home network 100 may also connect by way of a home network site exit, such as a gateway, router 150 to an Internet Service Provider (ISP) 160. The ISP 160 provides the home network devices with access to the Internet 165, a worldwide, publicly accessible network of interconnected computer networks that transmit data by packet switching using standard communication protocols.

The network connections of the various network capable devices may be direct connections as illustrated by the host platform 110a, media center 112a, personal multimedia device 114a, personal digital assistant 116a, and printer 118a in Room 1 or indirect connections using another network capable device as illustrated in Room 2 by the host platform 110b connecting the personal multimedia device 114b, personal digital assistant 116b, the video camera 117b, the printer 118b, and the camera 119b to the home network 100. The digital home network 100 may include both wired and wireless connections to the different home network devices (110-165) as seen.

For illustrative purpose, home networks 100 may have a number of complex devices (e.g. 112-165) in which problems arise and induce the consumer to seek technical support. For example, home network 100 may contain a media center 112a in which the Compact Disk Player will not stream certain file formats. More specifically, the consumer may attempt to access information regarding this issue via the internet with a query similar to, "what file formats can my CD Player stream?"

Figure 2:
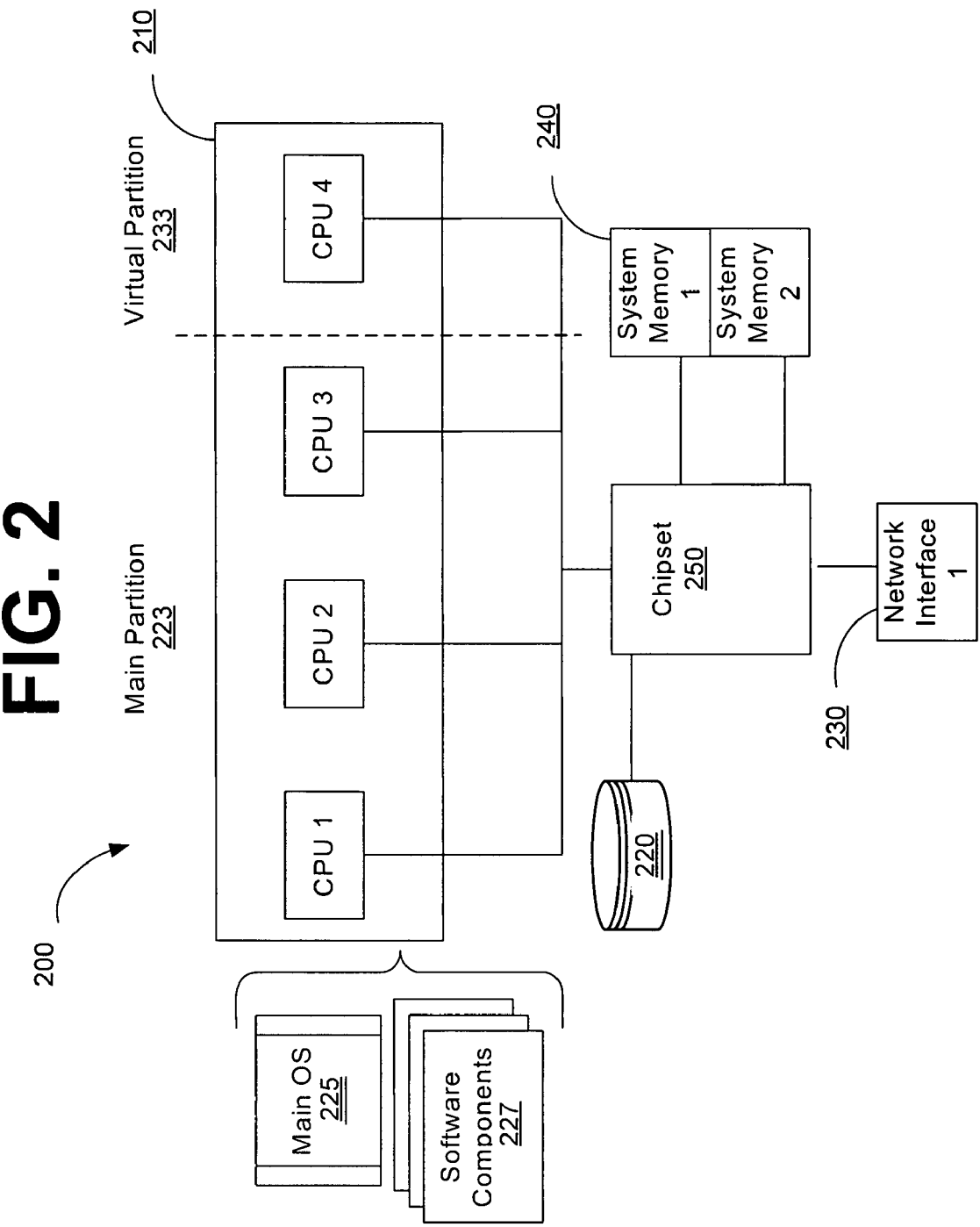
FIG. 2 illustrates a multi-processor host platform system as presented in FIG. 1 in further detail, according to an example embodiment.

In accordance with one embodiment, digital devices or appliances incorporating the processor host platform described in greater detail in FIG. 2 may be configured to perform the task of modifying the consumer query with device specific information 310 previously or presently obtained by the processor host platform. The modified query 302 may then be submitted to the internet or other technical support service. In the above illustration, the query may be expanded to, "what file formats can my Philips MC-i250 CD Player stream?" In various other embodiments, the host platform may be configured to perform a task of modifying a consumer query, an answer to a consumer query, or both.

FIG. 2 illustrates a multi-processor host platform system 200 as presented in FIG. 1 in further detail, according to an example embodiment. The system 200 includes a plurality of processors 210, a mass storage device 220, a network interface 230, memory 240, mid a chipset 250 coupled to each other as shown.

In one embodiment, the network interface 230 may be configured to monitor the network for packets of device information and descriptions of devices within the network, e.g. device specific information. In various embodiments, the network interface may monitor the network for device specific information from a dedicated virtual partition 233 on the host platform. In this manner, the monitoring and obtaining of device specific information may be accomplished with resources not allocated to the main partition, and accordingly, if the main partition 223 is busy or hibernating, the virtual partition 233 is able to continue monitoring for new devices. In the alternative, the network interface may monitor the network for device specific information from a main partition 233 along side other software components 227.

In one embodiment, system memory 240 may store a plurality of programming instructions designed to enable the chipset 250 and tie processors 210 to receive a query pertaining to a query subject and modify the query or an answer to the query based, at least in part, on information related to the query subject. In these and other embodiments, the system memory 240 may store a plurality of programming instructions designed to enable the chipset 250 and processors 210 to receive query results in a first order and reorder the results as a function of a scoring algorithm that takes into account stored data about devices present on the network.

The plurality of processors 210 are the primary resources allocated to the respective partitions and may include any variety of processors known in the art including, in one embodiment, processors having a plurality of processing cores, for example Intel® Pentium® D Processors, Intel® Core™ 2 Extreme, and Intel® Core™ 2 Duo. The processors may be adapted to function within generic computer systems, as well as, Intel® ViiV Embedded Personal Computers ("ViiV EPC"). The plurality of processors 210 may comprise an integrated circuit ("IC"), such as a semiconductor integrated circuit chip. In the embodiment illustrated in FIG. 2, the plurality of processors 210 may include a plurality of central processing units ("CPUs"). Additional or fewer processors may be used in various embodiments. The plurality of processors 210 may be logically and/or physically divided into a plurality of partitions. For example, in the illustrated embodiment, the processors 210 are divided into a main partition 223 and a virtual partition 233.

The at least one primary host processor associated with the main partition 223 is adapted to execute the one or more software components 227 and the operating system 225 which may include, for example, a general operating system such as Windows® operating systems, Linux, etc. The at least one processor associated with virtual partition 233 may be adapted to perform the monitoring and obtaining of device specific information from devices within or added to the network.

System memory 240 may include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 240 may comprise other and/or later-developed types of computer readable memory. Machines-readable firmware program instructions may be stored in memory 240. As described above, the instructions may be accessed and executed by the main partition 223 and/or the virtual partition 233 of host processor 210.

Figure 3:
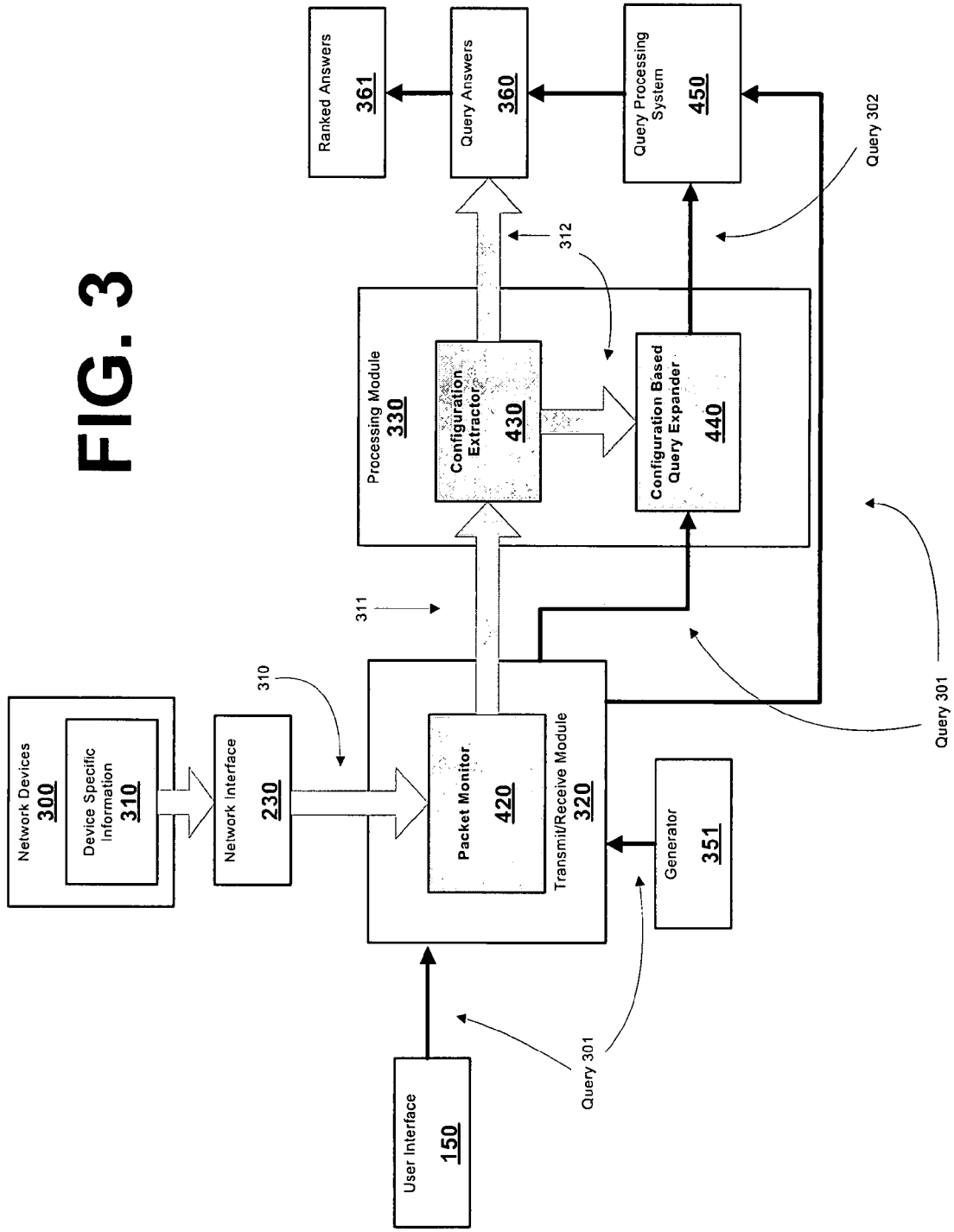
FIG. 3 illustrates a logical block diagram of a system according to an example embodiment.

FIG. 3 illustrates a logical block diagram of a system according to an example embodiment. The system of FIG. 3 provides an example application of query modification based on home network configurations as presented in FIGS. 1 and 2 is illustrated, in accordance with various embodiments. More specifically, FIG. 3 depicts the task related interactions associated with performing a modification of a query based on device specific information 310 received from network devices 300.

In one embodiment, network devices 300 transmit device specific information 310 to a transmit/receive module 320 via a network interface 230. It is contemplated that the transmit/receive module may be implemented in a hardware configuration or a software configuration. In one embodiment, the transmit/receive module 320 may contain a packet monitor 420. The packet monitor 420 may be integrated into a network interface card (not shown), run in a dedicated virtual partition 233 on a computer system, or run in a main partition 223 along side other applications. In various embodiments, the packet monitor 420 extracts or receives device information from a network device 300. In one embodiment, the packet monitor 420 monitors for Universal Plug and Play advertisements and device descriptions and maintains a time ordered log of the device information it receives. This log allows far query modification, as discussed below, when the network device 300 is not present, not powered on, or incapable of transmitting device specific information 230.

In one embodiment, the packet monitor 420 transmits the time ordered log 311, from the transmit/receive module 320, to a configuration extractor 430 located in a processing module 330. The processing module 330 may be implemented in a hardware configuration or a software configuration similar to the transmit/receive module 320. The configuration extractor 430 takes the device specific information 311 and creates word groups that are correlated with each other. In one embodiment, the word groups are stored in a configuration table 312. The configuration table 312 may then be applied, in various embodiments, to a query for the purpose of modification as will be discussed more below.

In various embodiments, a query may be entered by either of a user interface 350 or a generator 351. The user interface may be any one of a keyboard, a mouse, a computer screen, a touch pad, or any other user device capable of submitting a query. The generator 351 may be implemented in a hardware or software configuration.

In one embodiment, the generator 351 automatically generates a query 301 upon an occurrence of a network device being detected or a problem occurring within the network. The query 301 may pertain to common issues regarding the network deice or specific issues relating to the network device or the network in general. Similarly, in other embodiments, the user may generate a query 301 upon an occurrence of a problem with a device or a network.

In various embodiments, the query 301 initiated by the generator 351 or the user interface 350 is received by the transmit/receive module 320 and transmitted to at least one of a configuration based query expander 440 in a processing module 330, or a query processing system 450. In one embodiment, the transmit/receive module 320 sends the query 301, as received, directly to a query processing system 450. The query processing system may be any of an internet search engine, a telephony system, an online chat-room, or any other software or hardware configuration capable of receiving queries. In response to receiving the query 301, the query processing system returns query answers 360. In various embodiments, the configuration extractor 430 may then apply the configuration table 312 to the query answers to perform the post processing function of ranking the answers resulting in ranked answers 361. The ranked answers 361 may provide a fast and viable solution to a user's query or, in one embodiment, provide a list of the most likely causes of a problem or a list of the most common problems associated with a device should the generator 351 initiate the query.

In another embodiment, the query 301 is received by the transmit/receive module 320 and transmitted to a configuration based query expander 440 located in a processing module 330. Once a query 301 is received, the configuration based query expander 440 may apply the configuration table 312 from the configuration extractor 430 in order to concatenate or expand the query 301 with synonymous terms from the table 312. The expansion may include simply adding terms, deleting terms while adding others, or simply concatenating terms. In one embodiment, the configuration based query expander 440 then sends the modified query 302 to a query processing system 450 which returns query answers 360. The process of modifying the query prior to submitting it to a query processing system, or pre-processing, may create a more well-framed query which returns more relevant answers.

In yet another embodiment, preprocessing on a query 301 is performed and returns query answers 360. The query answers nay then undergo a similar post processing procedure to that describe above in which the configuration extractor applies the configuration table 312 to the pre-processed query answers returning ranked answers 361. In such a manner the system may incorporate pre-processing and post processing; only post processing; or only pre-processing. The post processing in such embodiments, may include re-ranking of at least some of the answers, such as Internet search engine query results. Further detail of such embodiments is described in greater detail below.

Although most embodiments described herein pertain to a home network environment and use of the configuration extractor 430 to build a configuration table 312, other embodiments are contemplated. For example, some embodiments may include one or both of pre and post-processing based on virtually any type of information of interest. That information may be represented in a table as words and the table may be used to expand searches or make theme more precise. The information may also be used to re-rank search results.

FIG. 4 is a block flow diagram of a method 400 according to an example embodiment. The example method 400 is a post-processing method of processing search results, such as search results from an Internet search engine or other searching tool. The example method 400 includes storing data of interest on a local computing device 402. The data of interest may be a configuration table as described above. However, the data of interest may include any data that a user or a system may be interested in. This data may be accumulated via a question and answer session, a tool that generates indexes as a function of the contents of files and documents stored on a computing device, or in another manner.

The method 400 further includes receiving query results in a first order in response to a user submitted query 404 and scoring each of at least a subset of the query results as a function of the data of interest 406. Based on the scoring, the method 400 also includes reordering the query results into a second order as a function of the scoring 408. The result is search results that are received based on a specific query, but are sorted based on information of interest to the query submitter.

In some embodiments, the scoring may include retrieving at least a subset of web pages represented in Internet search engine query results and identifying and counting unique features represented in the data of interest that occur in each of the retrieved web pages. The scoring may also include counting occurrences of each unique feature in each of the retrieved web pages scoring each of at least the subset of the query results as a function of a website from which the respective webpage is retrieved. The score may include one or more of these, and other, scoring mechanisms which may be considered individually or in sum.

Scoring each of at least the subset of the query results based on data of interest may also include scoring each of a plurality of features of a retrieved web page, weighting at least one feature, and summing each of the features, including weighted features, to determine a score for each retrieved webpage.

The re-ranking, or reordering, of search results may be considered in a more formal manner in view of contextual ranking. For a given user's query $q_k$ with the corresponding context $C_k$ (output of the configuration extractor), for each of the first P web pages $p_{jk}$ returned by the search engine, its new rain DR ($p_{jk}$) (as for Device Rank) may be calculated as follows.

First, for each page $p_{jk}$ a set of features $f_{ijk}$ is extracted, such as, for example:

$$f_{1jk} = \sum_{c_k} C(c_k, p_{jk})$$

where $c_k$ are all the words in the context $C_k$ and $C(c_k, p_{jk})$ is the count of all instances of $c_k$ in $p_{jk}$ (i.e. $f_{1jk}$ is proportional to the total number of context words in $p_{jk}$), or:

$$f_{2jk} = \sum_{c_k} C'(c_k, p_{jk})$$

where C' is 1 if $c_k$ is in $p_{jk}$, 0 otherwise (i.e. $f_{2jk}$ is proportional to the number of unique context words in $p_{jk}$). Another feature would indicate if the context words appear in the URL of $p_{jk}$ or in its title. These features allows incorporation of contextual information. Any number of other types of information and constraints may be included through the features $f_{ijk}$. For example, A feature that would allow promoting of "high quality," domain specific Web sites may be included, as for example:

$$f_{3jk} = \begin{cases} 1 & \text{if } p_{jk} \in D \\ 0 & \text{otherwise} \end{cases}$$

where D is the set of all domain specific sites identified to contain important or noteworthy information.

A linear combination of these features $f_{ijk}$ may then be calculated:

$$S(p_{jk}) = \sum_{i=1}^{N} w_i * f_{ijk}$$

Intuitively, one can see that the higher the value of this sum the more relevant is the page $p_{jk}$ to the query and context, this sum is thus an example of a "score" for page $p_{jk}$. The parameters $w_i$ are the weights assigned to each feature.

However, the original rank of the search engine may be used, $SER(p_{jk})$ in some embodiments. The original rank may be added to the score $S(p_{jk})$ as an additional feature multiplied by a factor $w_0$ which determines how much weight to give to the original search engine used. In such embodiments, the final score may be represented as:

$$DRS(p_{jk} \mid q_k, C_K) = w_0 * g(SER(p_{jk})) + \sum_{i=1}^{N} w_i * f_{ijk}$$

where $SER(p_{jk})$ is the search engine rank for the query $q_k$ which is just the position of the web page $p_{jk}$ in the returned list (rank=1 being the rank of first page returned).

Given these scores $DRS(p_{jk})$, the web pages $p_{jk}$ may be ranked by obtaining the Device Rank $DR(p_{jk})$, (rank=1 being the rank of the page with the highest score and so on). The ranked pages may then be presented via a web browsing application accordingly to $DR(p_{jk})$. In some embodiments, a "better" ranking $DR(p_{jk})$ may be made by learning the parameters $W=(w_0, w_1, \ldots, w_N)$ via a machine learning technique, such as logistic regression, or a variant thereof (as opposed to just setting them manually). The learning would find the optimal set of weights.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   obtaining data of interest on a local computing device, the data of interest consisting essentially of device specific information and device descriptions of network devices connected to a local network to which the local computing device is also connected;
   receiving a query with regard to one of the network device connected to the local network;
   modifying the query based on the data of interest and submitting the query to at least one query processor;
   receiving query results in a first order in response to a submitted query pertaining to one of the network devices;
   scoring each of at least a subset of the query results as a function of the data of interest;
   reordering the query results into a second order as a function of the scoring; and
   wherein:
   the query results includes query results from an Internet search engine; and
   the scoring each of at least the subset of the query results as the function of the data of interest includes:
   obtaining at least a subset of web page data of at least a subset of web pages represented in the Internet search engine query results; and
   identifying and counting unique features represented in the data of interest that occur in the obtained data of each of the web pages including counting occurrences of each unique feature in the obtained data of each of the web pages.

2. The method of claim 1, wherein the data of interest is obtained from a data store holding the data of interest.

3. The method of claim 1, wherein the scoring further includes scoring each of at least the subset of the query results as a function of a website from which the a respective webpage is retrievable.

4. The method of claim 1, wherein the scoring each of at least the subset of the query results as a the function of the data of interest further includes:
   scoring each of a plurality of features in the web page data;
   weighting at least one feature; and
   summing each of the features, including weighted features, to determine a score for each webpage.

5. The method of claim 1, further comprising:
   deriving a value for each search result from a position of the respective search result in the first order; and
   adding to a result of the scoring of each query result to the derived value of the respective search result.

6. The method of claim 5, further comprising:
   weighting one or more of the score of each search result and the value derived from a position of each search result in the first order.

7. The method of claim 1, wherein the submitted query is a query automatically generated by a query generator of the local computing device.

8. The method of claim 1, wherein the query, prior to submission by the local computing device, is modified.

9. A non-transitory machine-readable storage medium, with instructions thereon, which when executed cause a suitably configured machine to perform the method of claim 1.

* * * * *